United States Patent
Jecker et al.

(10) Patent No.: US 9,969,385 B2
(45) Date of Patent: May 15, 2018

(54) METHOD FOR CARRYING OUT A PARKING PROCESS FOR A VEHICLE AND DRIVER ASSISTANCE DEVICE

(75) Inventors: Nicolas Jecker, Esslingen (DE); Oliver Grimm, Flein (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days. days.

(21) Appl. No.: 14/241,103

(22) PCT Filed: Aug. 29, 2012

(86) PCT No.: PCT/EP2012/066773
§ 371 (c)(1),
(2), (4) Date: Feb. 26, 2014

(87) PCT Pub. No.: WO2013/030231
PCT Pub. Date: Mar. 7, 2013

(65) Prior Publication Data
US 2014/0371972 A1    Dec. 18, 2014

(30) Foreign Application Priority Data
Sep. 1, 2011    (DE) .................. 10 2011 112 149

(51) Int. Cl.
*B62D 15/02*    (2006.01)
*B60W 30/06*    (2006.01)

(52) U.S. Cl.
CPC ........... *B60W 30/06* (2013.01); *B62D 15/027* (2013.01); *B62D 15/0285* (2013.01)

(58) Field of Classification Search
CPC .............. G05D 1/0088; G05D 1/021; G05D 2201/0213; B62D 15/0285; B62D 15/025;
(Continued)

(56) References Cited

U.S. PATENT DOCUMENTS 8,098,174 B2 *    1/2012   Moshchuk et al. ........ 340/932.2
8,099,214 B2 *    1/2012   Moshchuk ......... B62D 15/0285
                                              180/204
(Continued)

FOREIGN PATENT DOCUMENTS

DE     10 2005 038 524 A1    2/2007
DE        102007027438 A1   12/2008
(Continued)

OTHER PUBLICATIONS

International Search Report for corresponding International Application No. PCT/EP2012/066773, dated Nov. 22, 2012 (4 pages).
(Continued)

*Primary Examiner* — Thomas G Black
*Assistant Examiner* — Demetra Smith-Stewart
(74) *Attorney, Agent, or Firm* — Osha Liang LLP

(57) ABSTRACT

The invention relates to a method for carrying out a parking process for a vehicle (1), in which the parking process is carried out at least semi-autonomously, a parking assistance device (2) of the vehicle being able to carry out an autonomous parking process or a semi-autonomous parking process and, depending on environmental conditions of the vehicle (1), the parking assistance device (2) deciding whether a parking process is carried out autonomously or semi-autonomously.

8 Claims, 1 Drawing Sheet

(58) Field of Classification Search
CPC .... B62D 15/0265; B62D 6/00; B62D 15/027; B62D 15/028; B60W 2550/10; B60W 30/09; B60W 10/20; B60W 2710/20; B60W 30/06; B60T 2201/10; G06K 9/00791; G06K 9/00805; G06K 9/00812; A47L 2201/04; G06T 2207/30261
See application file for complete search history.

(56) References Cited

U.S. PATENT DOCUMENTS

| | | | | |
|---|---|---|---|---|
| 8,150,593 | B2* | 4/2012 | Taki | B60T 7/22 340/435 |
| 8,310,376 | B2* | 11/2012 | Frank | G01S 7/527 340/425.5 |
| 8,718,861 | B1* | 5/2014 | Montemerlo | B60W 30/00 701/26 |
| 8,781,721 | B2* | 7/2014 | Dowdall | B60R 21/00 701/301 |
| 9,505,435 | B2* | 11/2016 | Wuttke | B62D 15/027 |
| 9,511,723 | B2* | 12/2016 | Eckert | B60T 7/22 |
| 2009/0260907 | A1* | 10/2009 | Moshchuk et al. | 180/167 |
| 2010/0204866 | A1* | 8/2010 | Moshchuk et al. | 701/25 |
| 2010/0220551 | A1* | 9/2010 | Akiyama | G01S 7/52003 367/99 |
| 2010/0329510 | A1* | 12/2010 | Schmid | 382/103 |
| 2011/0087405 | A1* | 4/2011 | Moshchuk et al. | 701/41 |
| 2011/0251755 | A1* | 10/2011 | Widmann | 701/36 |
| 2012/0072067 | A1* | 3/2012 | Jecker et al. | 701/25 |
| 2014/0052336 | A1* | 2/2014 | Moshchuk et al. | 701/41 |
| 2014/0085111 | A1* | 3/2014 | Faber | 340/932.2 |
| 2014/0121883 | A1* | 5/2014 | Shen et al. | 701/28 |

FOREIGN PATENT DOCUMENTS

| | | | |
|---|---|---|---|
| DE | 102009024062 A1 | 12/2010 | |
| DE | 102011118551 A1 * | 5/2013 | ........... B60W 30/06 |
| EP | 0 849 144 A2 | 6/1998 | |
| EP | 2089266 B1 * | 3/2010 | ........... B62D 15/027 |
| EP | 2 261 084 A1 | 12/2010 | |
| EP | 2 289 768 A2 | 3/2011 | |
| EP | 2289768 A2 * | 3/2011 | |
| WO | 2005/009787 A1 | 2/2005 | |

OTHER PUBLICATIONS

Search Report in counterpart German Patent Application No. 102011112149.1, dated Jun. 29, 2012 (5 pages).

* cited by examiner

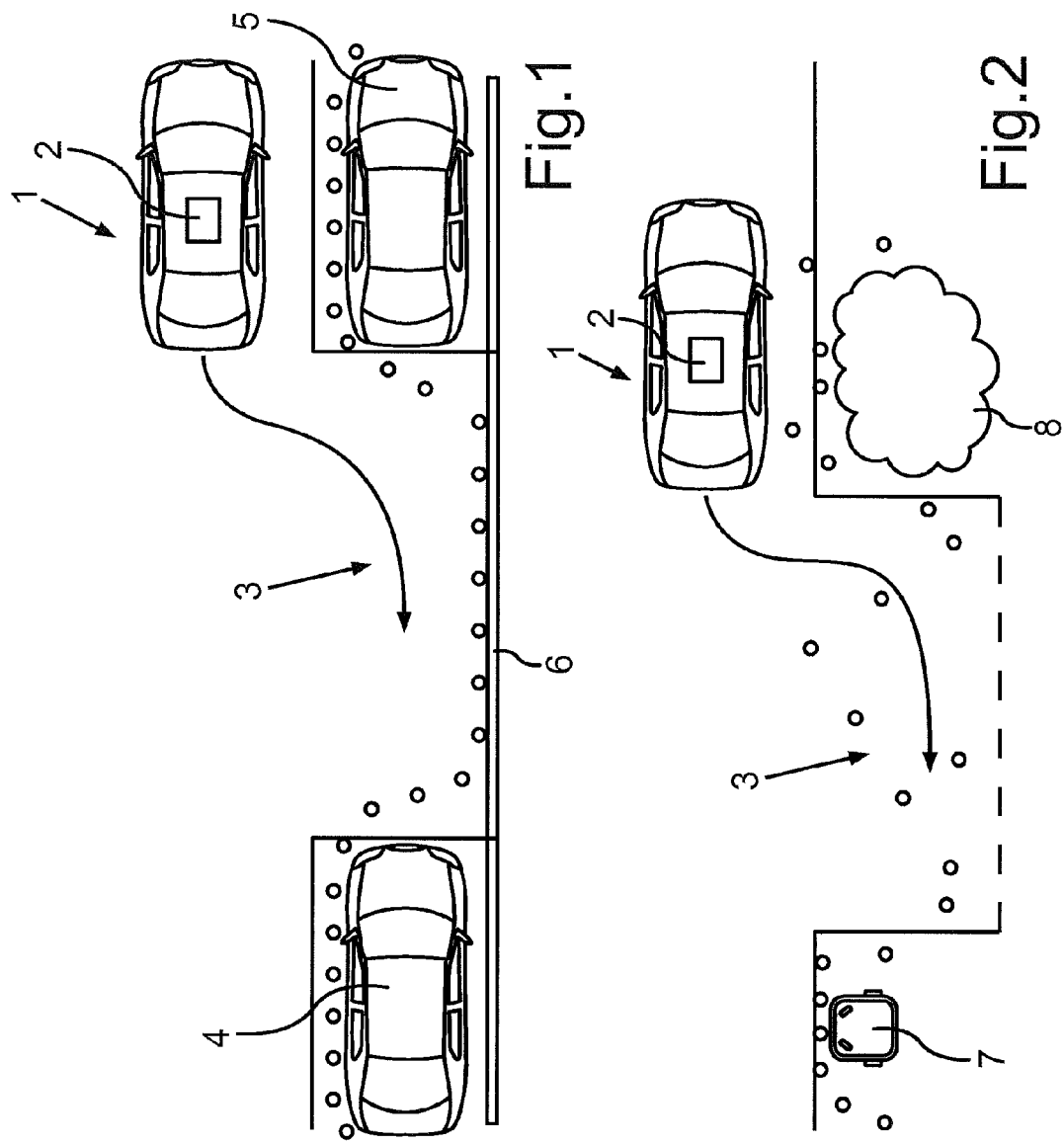

METHOD FOR CARRYING OUT A PARKING PROCESS FOR A VEHICLE AND DRIVER ASSISTANCE DEVICE

The invention relates to a method for carrying out a parking process for a vehicle, in which the parking process is carried out at least semi-autonomously. The invention also relates to a parking assistance device for a vehicle and to a vehicle having such a parking assistance device.

Parking assistance devices for vehicles which can carry out a semi-autonomous parking process are known. In these devices, only the steering is automatically actuated, but braking and acceleration must be carried out by the vehicle driver himself. In addition, parking assistance devices which, in contrast to this, can carry out only an autonomous parking process are known, which means that, in addition to the steering being automatically actuated, the brake and acceleration are also automatically actuated.

In these known parking devices, only one possibility is generally provided, which is disadvantageous on account of the multiplicity of different conditions during parking processes and can result in suboptimal parking processes.

DE 10 2005 038 524 A1 discloses a method for determining the depth limitation of the parking space using ultrasonic sensors.

The object of the present invention is to provide a method, a driver assistance device and a vehicle, with which or in which a parking process can be carried out in a manner more adapted to the situation.

This object is achieved by means of a method, a driver assistance device and a vehicle according to the independent claims.

In a method according to the invention for carrying out a parking process for a vehicle, the parking process is carried out at least semi-autonomously. A parking assistance device of the vehicle can carry out both an autonomous parking process and a semi-autonomous parking process. Depending on environmental conditions of the vehicle, the parking assistance device decides whether a parking process is carried out autonomously or semi-autonomously. A method is therefore provided, in which the parking assistance device is fundamentally formed with two different scenarios, namely an autonomous parking process or a semi-autonomous parking process. The parking assistance device can therefore fundamentally provide both the semi-autonomous and the autonomous performance of a parking process. In addition to this innovation already, it is furthermore also specified that the method is continued intelligently to the effect that it is selected how the parking process is now intended to be ultimately carried out on the basis of the situation, namely on the basis of the instantaneous environmental condition of the vehicle. As a result of such a procedure, parking processes can be carried out substantially more in line with demand and in a manner more adapted to the situation. The entire parking scenario can possibly be carried out more quickly and furthermore also more accurately.

Provision is preferably made for a detection value which characterizes the probability of correct obstacle detection in the environment of the vehicle to be taken into account for the decision. The decision as to whether the parking process is carried out autonomously or semi-autonomously is therefore made on the basis of this detection value. It is therefore already possible to state with very high precision whether a certain obstacle, in particular the environmental delimitation of a parking space with respect to the position and shape of the obstacles, can be detected with sufficient accuracy in order to then possibly be able to carry out autonomous parking.

A threshold value is preferably stipulated for the detection value and a semi-autonomous parking process is carried out if the threshold value is exceeded.

Provision is preferably made for the detection value to be taken into account on the basis of signal interference in the sensors of the parking assistance device which are provided for sensing the environment, in particular ultrasonic sensors, and/or tolerance ranges of the distance measurement and/or interference sound from ultrasonic signals. Precisely these specific possible error sources and inaccuracies are therefore used to form statements which define the detection value and on the basis thereof very accurately enable a decision as to how the parking process is intended to be carried out. This is always with regard to the fact that the highest possible degree of safety is ensured during the parking process, but, on the other hand, the parking process is also carried out very accurately and quickly.

Provision is preferably made for an obstacle to be taken into account as environmental condition during parking space measurement. In particular, obstacles adjoining a parking space or obstacles delimiting the parking space are taken into account in this case.

Provision is preferably made for the decision as regards whether a parking process is carried out autonomously or semi-autonomously to be made on the basis of information from only one sensor type for sensing the environment. It is therefore no longer necessary to pool different sensor types or different sensor technologies in order to be able to achieve a very high degree of reliability. In particular, the parking assistance device can therefore operate only with one sensor type, which can also be rated positively with respect to the costs of the parking assistance device and enables a more cost-effective implementation.

Only information from ultrasonic sensors of the parking assistance system or the parking assistance device is preferably taken into account. Provision is preferably made for the autonomous parking process to be carried out only for unique scenarios. In other scenarios, semi-autonomous manoeuvring into or out of a parking space can then be carried out.

In particular, provision is made for the vehicle driver to be informed of how the parking process is being carried out on a display unit. The definition of the scenarios to be provided can be based on the features of the environment which can be detected with the individually used sensor technology. For example, these may be object lengths of obstacles in the environment and/or the number of objects or obstacles and/or the parameters of the detected signals which have already been mentioned.

The invention also relates to a driver assistance device, in particular a parking assistance device, for a vehicle, which has at least one detector device for sensing the environment and comprises an evaluation unit which is designed to evaluate the information from the detector device. The parking assistance device is designed to carry out an autonomous and a semi-autonomous parking process, the parking assistance device being designed to decide, on the basis of detected environmental conditions of the vehicle, whether a parking process is carried out autonomously or semi-autonomously.

Advantageous embodiments of the method according to the invention can be considered to be advantageous embodiments of the parking assistance device. The respectively following steps are carried out and processed using the means of the parking assistance device.

Furthermore, the invention also relates to a vehicle having a driver assistance device according to the invention or an advantageous refinement thereof.

One exemplary embodiment of the invention is explained in more detail below using schematic drawings, in which:

FIG. 1 shows a plan view of a scenario in which an autonomous parking process is carried out; and FIG. 2 shows a plan view of a scenario in which only a semi-autonomous parking process is carried out.

In the figures, identical or functionally identical elements are provided with the same reference symbols.

FIG. 1 shows a plan view of a scenario in which a vehicle 1 having a parking assistance device 2, which has a plurality of ultrasonic sensors, is intended to park in a parking space 3. The vehicle 1 can carry out both a semi-autonomous and an autonomous parking process under the control of the parking assistance device 2. Depending on environmental conditions of the vehicle 1, the parking assistance device 2, which also comprises an evaluation unit in addition to the sensors, decides whether the parking process is carried out autonomously or semi-autonomously.

In the present scenario according to FIG. 1, the parking assistance device 2 detects, on the one hand, that the parking space 3 is sufficient to park the vehicle 1 therein and, on the other hand, the environment of the parking space 3 and, in particular, the objects delimiting the parking space 3, in the form of vehicles 4 and 5 which have already been parked and a kerb 6, can be detected with sufficient accuracy with respect to position and configuration.

For the decision as to whether the process of parking in the parking space 3 is intended to be carried out autonomously or semi-autonomously, a reliability value or a detection value is determined and is compared with a stored threshold value. The detection value is determined, in particular, on the basis of signal interference in the ultrasonic sensors which are provided for sensing the environment and/or their signal tolerance ranges of the distance measurement and/or interference sound from ultrasonic sensors. In addition to the measurements already mentioned, this is carried out with regard to the detection of the objects or obstacles delimiting the parking space 3. In the exemplary embodiment, this detection value is below the threshold value and the parking assistance device 2 therefore decides that an autonomous parking process is carried out.

As indicated in this case by the illustration in FIG. 1, the parking space 3 is characterized, with respect to its delimitations, by three long objects, the vehicles 4 and 5 and the kerb 6, which furthermore can also still be detected without interference or with negligible interference.

In contrast, FIG. 2 shows a plan view of a scenario in which a parking space 3 is delimited at the front and at the rear by different objects or obstacles, in which case these are a dustbin 7 and a tree 8, for example. In the depth between the dustbin 7 and the tree 8, there is no further delimitation at all, in particular no kerb either, as is formed in FIG. 1. In addition, in comparison with FIG. 1, there is a relatively large amount of interference according to the illustration in FIG. 2, which is illustrated by the dots. In such a scenario, the detection value is therefore above a threshold value and the parking assistance device 2 decides to carry out a parking process only semi-autonomously.

The invention claimed is:

1. A method for carrying out a parking process for a vehicle, in which the parking process is carried out at least semi-autonomously, the method comprising:
   carrying out an autonomous parking process or a semi-autonomous parking process, by a parking assistance device of the vehicle, wherein
   depending on environmental conditions of the vehicle, deciding, by the parking assistance device, whether the parking process is carried out autonomously or semi-autonomously,
      wherein in the autonomous parking process, steering, acceleration and braking are under the control of the parking assistance device,
      wherein in the semi-autonomous parking process steering, but not acceleration and braking, is under the control of the parking assistance device,
      wherein a detection value which characterizes a probability of correct obstacle detection in the environment of the vehicle is taken into account for the decision,
      wherein the detection value is taken into account on the basis of information from only one sensor type for sensing the environment, and wherein the only one sensor type is ultrasonic.

2. The method according to claim 1, wherein a threshold value is stipulated for the detection value and a semi-autonomous parking process is carried out if the threshold value is exceeded.

3. The method according to claim 1, wherein at least one obstacle is taken into account as environmental conditions during parking space measurement.

4. The method according to claim 3, wherein obstacles adjoining a parking space are taken into account.

5. The method according to claim 1, wherein the decision as to whether a parking process is carried out autonomously or semi-autonomously is made on the basis of information from only one sensor type for sensing the environment.

6. The method according to claim 5, wherein only information from ultrasonic sensors of the parking assistance device is taken into account.

7. A parking assistance device for a vehicle, comprising:
   a detector device for sensing an environment surrounding the vehicle; and
   an evaluation unit for evaluating information from the detector device, the parking assistance device being configured to carry out an autonomous and a semi-autonomous parking process, and to decide, on the basis of detected environmental conditions of the vehicle, whether the parking process is carried out autonomously or semi-autonomously,
      wherein in the autonomous parking process, steering, acceleration and braking are under the control of the parking assistance device,
      wherein in the semi-autonomous parking process steering but not acceleration and braking is under the control of the parking assistance device,
      wherein a detection value which characterizes a probability of correct obstacle detection in the environment of the vehicle is taken into account for the decision,
      wherein the detection value is taken into account on the basis of information from only one sensor type for sensing the environment, and wherein the only one sensor type is ultrasonic.

8. A vehicle having a parking assistance device according to claim 7.

* * * * *